Nov. 5, 1957   J. D. BRYAN   2,812,493
SYNCHROSCOPES
Filed April 21, 1953

INVENTOR.
JAMES D. BRYAN
BY Billy G. Corber 2,812,493
Patented Nov. 5, 1957

2,812,493
SYNCHROSCOPES

James David Bryan, Baltimore, Md., assignor to Aircraft Armaments, Inc., Baltimore, Md., a corporation of Ohio Application April 21, 1953, Serial No. 350,152

8 Claims. (Cl. 324—68)

This invention relates in general to devices for analyzing pulse type wave forms and more particularly to a synchroscope for precisely measuring the time interval between pulses of electrical energy in a pulse train.

It is an object of this invention to provide a synchroscope for precisely measuring the time interval between electrical pulses such as in a coded signal substantially without limitation as to the pulse width and repetition rate.

It is another object of this invention to provide a system which will indicate the pulse shape as well as determine the time interval between successive pulses.

It is still another object of this invention to provide a synchroscope of simple and rugged construction which may be packaged as a single portable unit.

Further and other objects will become apparent from a reading of the following detailed description when considered in combination with the accompanying drawing wherein like numerals refer to like parts.

Figure 1:
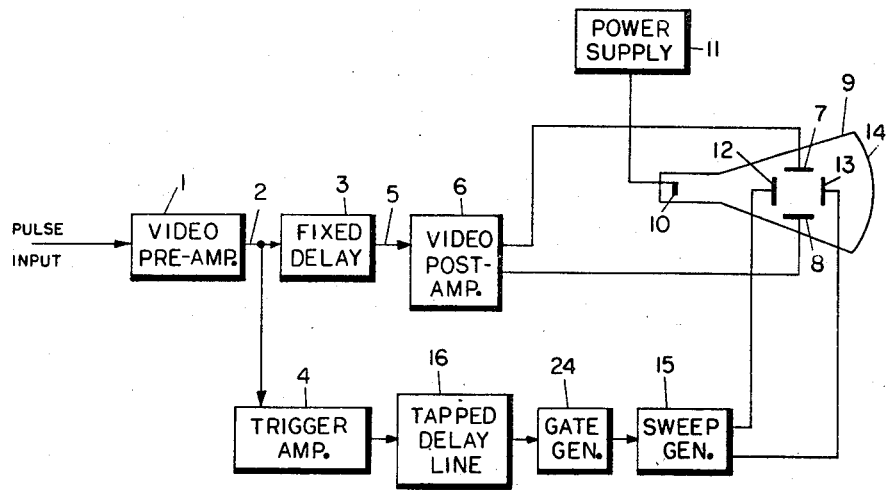
Figure 1 is a schematic block diagram of the synchroscope circuit of this invention.

As shown in Figure 1 a video pre-amplifier 1 in the synchroscope circuit receives the pulses to be analyzed. Output 2 of amplifier 1 is fed to a fixed time delay line 3 and to a trigger amplifier 4. The amplified pulses applied to delay line 3 are detained therein a predetermined length of time for purposes hereinafter described and then allowed to pass through output lead 5 into a video post-amplifier 6 where the delayed pulses are again amplified.

The amplified pulse output from the post-amplifier is applied to a pair of vertical deflection plates 7 and 8 in a cathode ray tube 9. Cathode 10 of tube 9 connects with a suitable power supply 11 for producing an electron beam which impinges upon a screen 14 provided at the forward face end of the tube. The position of the electron beam is controlled in one coordinate direction by the pulse voltage applied to the vertical deflection plates 7 and 8 and in a second coordinate direction normal to the one coordinate direction by a sweep voltage applied to a pair of horizontal deflection plates 12 and 13. The sweep voltage applied to plates 12 and 13 is a linearly varying voltage of fixed duration generated by sweep voltage generator 15 in response to a triggering pulse produced by trigger amplifier 4 in response to a signal pulse from the output of pre-amplifier 1. When a trigger pulse is applied to the sweep generator, the resulting sweep voltage causes the electron beam in tube 9 to move across the face thereof in the conventional manner. After the sweep generator has been energized by a triggering pulse, it remains insensitive to other triggering pulses which occur during the interval between the pulses, the spacing of which is to be measured, through the use of conventional blanking means such as gate generator 24. The gate generator is actuated by the first trigger pulse to prevent the passage of subsequent trigger pulses for a predetermined length of time. Where a pulse train is involved having a group of unevenly spaced pulses which repeat themselves to form pulse cycles, the blanking period is selected so that a sweep voltage will be generated only once during each cycle and then only by the pulse which corresponds with the identical pulse in the preceding cycle. These identical pulses which are used to generate a sweep voltage are hereinafter referred to as reference pulses.

Figures 2, 3:
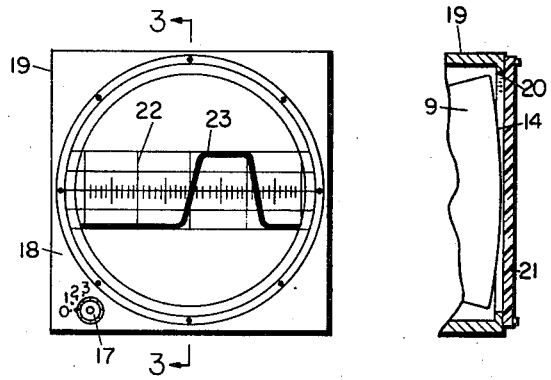
Figure 2 is a front view of the synchroscope showing the cathode ray tube presentation.
Figure 3 is a fragmentary sectional view taken on line 3—3 of Figure 2.

An accurately calibrated tapped delay line 16 is interposed between sweep generator 15 and trigger amplifier 4 for delaying the trigger pulses a desired and accurately controlled amount relative to a signal pulse so as to produce a corresponding delay in the operation of the sweep generator. The desired time delay may be introduced in the sweep circuit manually by simply turning knob 17 located on the front control panel 18 of the synchroscope housing 19 as best shown in Figure 2. As schematically indicated in Figure 2, for purposes of illustration, the tapped delay line is shown as having four different time delay settings. Obviously, the delay line may be provided with any desired number of time delay settings.

A generally circular opening 20 provided in housing 19 as best shown in Figure 3 permits viewing a pattern displayed on screen 14 of cathode ray tube 9. A transparent or semi-transparent cover 21 of such material as Plexiglas is placed over the face of tube 9 and secured to housing 19. Cover 21 is provided with ruled lines 22 etched therein for quickly and accurately determining the relative position of a pulse trace 23 appearing on screen 14.

The input signal pulses to be analyzed perform two distinct functions in the synchroscope. They produce trigger pulses for actuating the sweep generator and they product the electron beam control voltage for the vertical deflection plates of the cathode ray tube. When the sweep voltage from the sweep generator is applied to the horizontal deflection plates of the cathode ray tube simultaneously with a pulse voltage applied to the vertical deflection plates, a trace of the pulse appears on the cathode ray tube screen. The exact position of the pulse on the screen depends upon when the pulse voltage is applied relative to the sweep. That is, if the pulse voltage is applied at the start of the sweep the pulse trace will appear at one side of the screen; if the pulse voltage is applied near the end of the sweep the pulse trace will appear at the opposite side of the screen; if the pulse voltage is applied between the beginning and end of the sweep the pulse trace will appear in a corresponding intermediate position on the screen.

In operation, the time interval between successive pulses in a pulse train is accurately determined by first displaying a pulse trace on the cathode ray tube screen with the tapped delay line 16 set at zero time delay. With the zero time delay setting, the same signal pulse which triggers the sweep generator is displayed by the cathode ray tube since the pulse signal voltage and the sweep voltage produced by the signal pulse are both applied to the deflection plates simultaneously. The fixed delay line 3 is employed to delay the signal pulse voltage applied to the vertical deflection plates 7 and 8 so that it will appear in point of time near the center of the sweep as shown in the timing diagram of Figure 4 rather than at the start of the sweep. With the tapped delay line 16 set at zero, the position of this first pulse will always appear at the same place relative to the start of the sweep.

The precisely calibrated tapped delay line which may be switched to provide delays of known amounts is operated to delay the trigger pulses to the synchroscope sweep generator 15. The sweep is increasingly delayed in time with respect to the first or reference pulse until a second pulse, the position of which is to be measured relative to said reference pulse, appears on the cathode ray tube. If the position of this second pulse on the cathode ray tube is identical with that of the first pulse then the time interval between the two pulses is equal to the delay set into the delay line. If the position of the second pulse does not coincide with the position of the first pulse the deviation may be measured by the lines etched on the Plexiglas covering 21. This deviation in position is proportional to the difference between the delay time introduced by the tapped delay line 16 and the time interval between the pulses. This time difference may be added to, or subtracted from, the precision delay line setting as required to determine the actual time interval between the pulses. For example, if the amount of delay introduced into delay line 16 is two microseconds, the sweep speed of sweep generator 15 is 0.25 microsecond per inch and the deviation of the second pulse from the position of the first pulse is 0.1 inch to the right of the first pulse position, then the time interval between the two pulses is 2 plus 0.025, or 2.025 microseconds. If, in this example, the second pulse appears to the left of the first position pulse by 0.1 inch then the pulse time interval is the difference between 2 and 0.025, or 1.975 microseconds.

Figure 4:
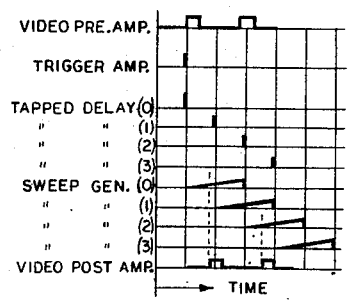
Figure 4 is a timing diagram for the circuit of Figure 1.

The timing diagram in Figure 4 illustrates the effect of introducing this time delay in the sweep circuit as described above wherein the sweep applied to the horizontal deflection plates of the cathode ray tube is delayed in time so as to appear simultaneously with a succeeding signal pulse in the pulse train.

Measurement of the displacement of the second pulse trace displayed on the cathode ray tube relative to a reference position serves as a vernier scale for the tapped delay line and provides a highly accurate system for determining pulse time intervals.

It is to be understood that certain alterations, modifications and substitutions may be made without departing from the spirit and scope of this invention as defined by the appended claims.

I claim:

1. A synchroscope for accurately measuring the time interval between pulses of electrical energy in a pulse train having recurring pulses comprising, a cathode ray tube having an electron beam and vertical and horizontal deflection plates for moving the electron beam, said tube including a screen for visually displaying the electron beam to represent an electrical signal applied to said deflection plates, amplifier means connecting with said vertical plates and responsive to said pulses in the pulse train including a recurring reference pulse of electrical energy for moving said electron beam in one coordinant direction, a sweep generator connecting with said horizontal deflection plates and responsive to said reference pulse of electrical energy for generating a sweep voltage moving said electron beam in a second coordinant direction generally normal to said one coordinant direction, pulse delay means connecting with said amplifier means to produce a visible trace of said reference pulse near the center of said sweep voltage, blanking means connecting with said sweep generator and rendering the same insensitive to subsequent pulses which occur during the interval between reference pulses, stepped time delay means connecting with said amplifier means and responsive to said pulses for precisely delaying the operation of said sweep generator whereby a second pulse is applied to said deflection plates through said amplifier means simultaneously with the application of said sweep voltage to produce a second pulse trace on said screen, and a substantially transparent sheet covering said screen, said sheet having a plurality of reference marks thereon for indicating the difference in position between said second pulse trace and said first mentioned pulse trace to determine the time interval between said reference and second pulses.

2. A synchroscope for accurately measuring the time interval between pulses of electrical energy in a pulse train having recurring pulses comprising, a cathode ray tube having an electron beam and vertical and horizontal deflection plates for moving the electron beam, said tube including a screen for visually displaying the electron beam to represent an electrical signal applied to said deflection plates, amplifier means connecting with said vertical plates and responsive to said pulse train including a recurring reference pulse of electrical energy for moving said electron beam in one coordinant direction, a sweep generator connecting with said horizontal deflection plates and responsive to said recurring reference pulse of electrical energy for generating a sweep voltage moving said electron beam in a second coordinant direction generally normal to said one coordinant direction, time delay means connecting with said amplifier means to produce a visible trace of pulses near the center of said sweep voltage, blanking means connecting with said sweep generator and rendering the same insensitive to subsequent pulses which occur during the interval between the recurring reference pulses, variable time delay means connecting with said amplifier means and responsive to said pulses for delaying the operation of said sweep generator whereby a second pulse is applied to said deflection plates through said amplifier means simultaneously with the application of said sweep voltage to produce a pulse trace on said screen, and indicating means displaying the delay of said sweep generator and the position of said trace relative to a reference position to accurately determine the time interval between said reference and second pulses.

3. A synchroscope for accurately measuring the time interval between pulses of electrical energy in a pulse train having recurring pulses comprising, a cathode ray tube having an electron beam and vertical and horizontal deflection plates for moving the electron beam, said tube including a screen for visually displaying the electron beam to represent an electrical signal applied to said deflection plates, amplifier means connecting with said vertical plates and responsive to said pulse train including a recurring reference pulse of electrical energy for moving said electron beam in one coordinant direction, a sweep generator connecting with said horizontal deflection plates and responsive to said recurring reference pulse of electrical energy for generating a sweep voltage moving said electron beam in a second coordinant direction generally normal to said one coordinant direction, blanking means connecting with said sweep generator and rendering the same insensitive to subsequent pulses which occur during the interval between reference pulses, stepped time delay means connecting with said sweep generator and responsive to said pulses for precisely delaying the operation of said sweep generator whereby a second pulse is applied to said deflection plates through said amplifier means simultaneously with the application of said sweep voltage to produce a pulse trace on said screen, and a substantially transparent sheet covering said screen, said sheet having a plurality of marks thereon for indicating the position of said pulse trace relative to a reference position for accurately determining the time interval between said reference pulse and said second pulse.

4. A synchroscope for accurately measuring the time interval between pulses of electrical energy in a pulse train having recurring pulses comprising, a cathode ray tube producing an electron beam and having vertical and horizontal deflection plates for moving the electron beam, said tube including a screen for visually displaying the electron beam to represent an electrical signal applied to said deflection plates, amplifier means connecting with said vertical plates and responsive to said pulses of electrical energy for moving said electron beam in one coordinant direction, a sweep generator connecting with said horizontal deflection plates and responsive to said pulses of electrical energy for generating a sweep voltage for moving said electron beam in a second coordinant direction generally normal to said one coordinant direction, said tube being responsive to the simultaneous application of electrical energy to said horizontal and vertical deflection plates to visually present a signal applied to said vertical plates, variable time delay means connecting with said sweep generator for delaying transmission of said pulses to said sweep generator but not affecting said pulses transmitted to said vertical plates, whereby electrical energy obtained from different pulses in the pulse train, depending on the magnitude of the delay introduced by said time delay means, may be applied to said deflection plates simultaneously with said sweep voltage to produce a pulse trace on said screen, and means for indicating the delay of said sweep generator and the position of said pulse trace relative to a reference position to indicate the time interval between said different pulses.

5. A synchroscope for accurately measuring the time interval between pulses of electrical energy in a pulse train having recurring pulses comprising an amplifier receiving said pulses, a cathode ray tube having vertical and horizontal deflection plates, sweep generating means connecting with said horizontal deflection plates and with said amplifier and generating a sweep voltage in response to one of said pulses, delay means connecting with said sweep generating means for delaying said sweep voltage by an amount approximately equal to the time interval between said one pulse and a succeeding pulse in said pulse train, means connecting with said amplifier for applying said succeeding pulse to the vertical deflection plates in cooperation with the delayed sweep voltage generated in response to said one pulse, and means for indicating the delay of said sweep voltage and the position of said pulse trace relative to a reference position to indicate the time interval between said pulses.

6. A synchroscope for measuring the time interval between pulses of electrical energy in a pulse train having recurring pulses comprising, pulse receiving means, a cathode ray tube having a screen, first means connecting with said tube and receiving means and generating a sweep voltage in response to said pulses, second means connecting with said receiving means and responsive to said pulses and connecting with said tube for displaying a visible trace of said pulses on the screen of said tube, means connecting with said sweep generator for delaying the generation of said sweep voltage in response to said pulses without affecting pulses transmitted to said second means whereby to display pulses in said pulse train other than those initiating the generation of said sweep voltage, and means for indicating the magnitude of said delay.

7. A synchroscope for measuring the time interval between pulses of electrical energy in a pulse train comprising, pulse receiving means, a cathode ray tube having horizontal and vertical deflection plates, means connecting with said receiving means and generating a sweep voltage in response to a first pulse in said pulse train and applying said sweep voltage to said horizontal deflection plates, means connecting with said receiving means for applying a second pulse in said pulse train to said vertical deflection plates, said tube being responsive to the simultaneous application of a sweep voltage and an applied pulse to display a visible trace of the applied pulse, means connecting with said sweep generator for delaying said sweep voltage generated in response to a first pulse without affecting pulses applied to said vertical deflection plates so as to be applied simultaneously with said second pulse whereby to produce a visible trace of said second pulse, and means for indicating the magnitude of said delay.

8. A method for accurately measuring the time interval between pulses of electrical energy in a pulse train using a cathode ray tube producing an electron beam and having a screen for visually displaying said electron beam to visually present said pulses comprising, initiating the generation of a linear sweep voltage in response to said pulses, deflecting the electron beam of said tube in one co-ordinate direction in accordance with said sweep voltage, deflecting the electron beam in a second coordinate direction generally normal to said one coordinate direction in accordance with a voltage representing each said pulse, noting the position of the pulse trace appearing on the screen of the cathode ray tube, then delaying the initiation of the linear sweep voltage in response to one of said pulses sufficiently to produce a second pulse trace on said screen from a pulse in the pulse train different from the pulse initiating the generation of a linear sweep voltage, and measuring the delay and algebraically adding said delay to the time displacement of said second pulse trace from said first mentioned pulse trace on said screen to determine the time interval between said pulse and said second pulse.

References Cited in the file of this patent

UNITED STATES PATENTS

| | | |
|---|---|---|
| 2,414,477 | Meacham | Jan. 21, 1947 |
| 2,430,154 | Woodward | Nov. 4, 1947 |
| 2,626,313 | Napolin | Jan. 20, 1953 |